United States Patent
Wang et al.

(10) Patent No.: US 9,253,732 B2
(45) Date of Patent: Feb. 2, 2016

(54) MOBILE DEVICE AND METHOD FOR IMPROVING CALL PERFORMANCE OF THE MOBILE DEVICE

(71) Applicants: SHENZHEN FUTAIHONG PRECISION INDUSTRY CO., LTD., Shenzhen (CN); Chiun Mai Communication Systems, Inc., New Taipei (TW)

(72) Inventors: Xiao-Dong Wang, Shenzhen (CN); Jian Sha, Shenzhen (CN)

(73) Assignees: SHENZHEN FUTAIHONG PRECISION INDUSTRY CO., LTD., Shenzhen (CN); Chiun Mai Communication Systems, Inc., New Taipei (TW)

( * ) Notice: Subject to any disclaimer, the term of this patent is extended or adjusted under 35 U.S.C. 154(b) by 109 days.

(21) Appl. No.: 14/144,622

(22) Filed: Dec. 31, 2013

(65) Prior Publication Data

US 2014/0200018 A1 Jul. 17, 2014

(30) Foreign Application Priority Data

Jan. 17, 2013 (CN) .......................... 2013 1 0016564

(51) Int. Cl.
*H04W 52/24* (2009.01)
*H04W 52/14* (2009.01)
*H04W 52/36* (2009.01)

(52) U.S. Cl.
CPC .......... *H04W 52/146* (2013.01); *H04W 52/242* (2013.01); *H04W 52/247* (2013.01); *H04W 52/367* (2013.01)

(58) Field of Classification Search
CPC . H04W 24/02; H04W 52/146; H04W 52/367; H04W 52/427; H04W 52/242
USPC .......................... 455/452.1, 522; 370/330, 338
See application file for complete search history.

(56) References Cited

U.S. PATENT DOCUMENTS

2013/0005270 A1* 1/2013 Weinholt et al. ............. 455/63.1

* cited by examiner

*Primary Examiner* — Sam Bhattacharya
(74) *Attorney, Agent, or Firm* — Novak Druce Connolly Bove + Quigg LLP

(57) ABSTRACT

In a method for improving call performance of a mobile device, the strength of received signals is sent to a base station when the mobile device receives signals from the base station. The method obtains a path balance value sent by the base station, and determines whether the path balance value is greater than a predefined threshold value. The path balance value is obtained according to the strength of the received signals of the mobile device and an emission intensity of the mobile device. When the path balance value is greater than the predefined threshold value, the method obtains a transmitting power of the mobile device, and increases the transmitting power of the mobile device according to the path balance value to improve call performance of the mobile device.

15 Claims, 2 Drawing Sheets

MOBILE DEVICE AND METHOD FOR IMPROVING CALL PERFORMANCE OF THE MOBILE DEVICE

BACKGROUND

1. Technical Field

Embodiments of the present disclosure relate to communication technologies, and particularly to a mobile device and a method for improving call performance of the mobile device.

2. Description of Related Art

When a mobile device (e.g., a mobile phone) makes a call, the mobile device receives signals from a base station. The mobile device sends the strength of the received signals back to the base station. Because jamming, such as a wireless signal from a radio station, affects on the mobile device, the strength of the received signals is not the signal strength that the mobile device actually receives from the base station, and the strength of the received signals of the mobile device is superposed by a jamming intensity of the mobile device and the signal strength that the mobile device receives from the base station. The base station compares the strength of the transmitted signals as transmitted from the base station to the strength of the received signals of the mobile device. If needed, the base station sends a command to the mobile device to adjust a transmitting power of the mobile device according to the strength of the received signals of the mobile device while the signal strength of the base station usually cannot be adjusted once the base station is built. For example, when the base station determines that the strength of the received signals of the mobile device is too high, the mobile device reduces the transmitting power according to the command. Because there is an effect of the jamming intensity of the mobile device on the strength of the received signals of the mobile device, and because the transmitting power of the mobile device is adjusted according to the strength of the received signals of the mobile device, the transmitting power of the mobile device can be reduced when the mobile device receives low signal strength. However, when the mobile device receives low signal strength, and the mobile device further has low transmitting power, the mobile device may drop a call, which affects call performance of the mobile device. Therefore, there is room for improvement in the art.

DETAILED DESCRIPTION

The disclosure, comprising the accompanying drawings, is illustrated by way of examples and not by way of limitation. It should be noted that references to "an" or "one" embodiment in this disclosure are not necessarily to the same embodiment, and such references mean "at least one."

In general, the word "module," as used herein, refers to logic embodied in hardware or firmware unit, or to a collection of software instructions, written in a programming language. One or more software instructions in the modules may be embedded in firmware unit, such as in an EPROM. The modules described herein may be implemented as either software and/or hardware modules and may be stored in any type of non-transitory computer-readable medium or other storage device. Some non-limiting examples of non-transitory computer-readable media may comprise CDs, DVDs, BLU-RAY, flash memory, and hard disk drives.

Figure 1:
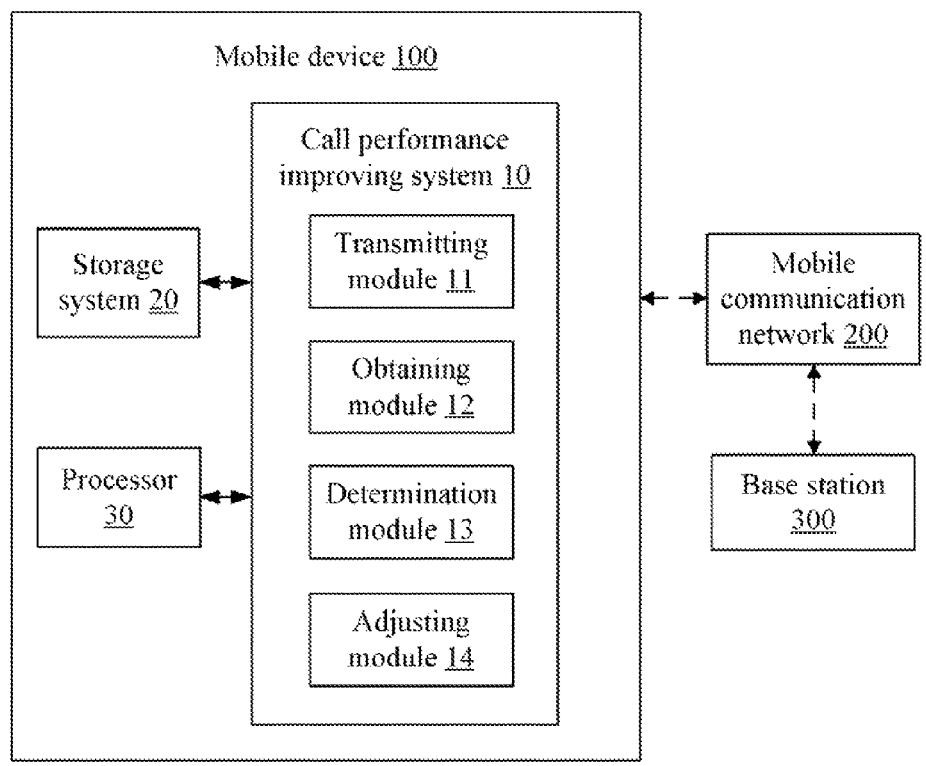
FIG. 1 is a schematic diagram of one embodiment of a mobile device comprising a call performance improvement system.

FIG. 1 is a schematic diagram of one embodiment of a mobile device 100 comprising a call performance improvement system 10. The mobile device 100 can be, but is not limited to, a mobile phone or a personal digital assistant (PDA). The mobile device 100 communicates with a base station 300 through a mobile communication network 200. The mobile communication network 200 can be, but is not limited to, a GSM network or a WCDMA network.

The mobile device 100 further comprises a storage system 20 and a processor 30. The storage system 20 can be a memory (e.g., random access memory, or flash memory) of the mobile device 100. The processor 30 executes one or more computerized codes and other applications of the mobile device 100 to provide functions of the call performance improvement system 10. The call performance improvement system 10 is used to improve call performance of the mobile device 100 for reducing call-dropping of the mobile device 100.

In the embodiment, the call performance improvement system 10 comprises a transmitting module 11, an obtaining module 12, a determination module 13, and an adjusting module 14. The modules 11-14 comprise computerized codes in the form of one or more programs that are stored in the storage system 20. The computerized codes comprise instructions that are executed by the processor 30 to provide functions of the modules 11-14.

When the mobile device 100 receives signals from the base station 300, the transmitting module 11 sends the strength of the received signals to the base station 300. In the embodiment, the strength of the received signals of the mobile device 100 is superposed by a jamming intensity of the mobile device 100 and the signal strength that the mobile device 100 actually receives from the base station 300. The jamming intensity of the mobile device 100 indicates an intensity of jamming that the mobile device 100 accepts when the received signals are sent from the base station 300 to the mobile device 100. The jamming indicates that other signals are interfering with the mobile device 100. The jamming can be, but is not limited to, a wireless signal from a radio station, or a wireless signal from other kind base station (e.g., a wireless signal received by a GSM mobile phone from a CDMA base station).

In the embodiment, when the base station 300 receives the strength of the received signals of the mobile device 100, the base station 300 also receives an emission intensity of the mobile device 100. The emission intensity of the mobile device 100 is obtained from an attenuation of a transmitting power of the mobile device 100 in a travel process from the mobile device 100 to the base station 300. The attenuation can be caused by reflection, refraction, and the distance the signals need to travel. For example, if the transmitting power of the mobile device 100 is 30 decibels (dB) referenced to one milliwatt (abbreviated as "dBm"), an emission intensity of −80 dBm is obtained from attenuation of 30 dBm in the travel process.

In the embodiment, the base station 300 obtains a path balance value according to the strength of the received signals of the mobile device 100 and the emission intensity of the mobile device 100, and sends the path balance value to the mobile device 100. The path balance value is a difference between the strength of the received signals of the mobile device 100 and the emission intensity of the mobile device

100. For example, if the strength of the received signals of the mobile device 100 is −70 dBm, and the emission intensity of the mobile device 100 is −80 dBm, the path balance value is 10 dB. The dB is a dimensionless unit that is used for quantifying the ratio between two values.

The obtaining module 12 obtains the path balance value sent by the base station 300.

The determination module 13 determines whether the path balance value is greater than a predefined threshold value. The predefined threshold value can be preset or set by a user. In one embodiment, the threshold value is 4 dB.

It should be noted that the emission intensity of the mobile device 100 is usually between about 0 dBm and about 32 dBm, and the jamming intensity of the mobile device 100 does not exceed −50 dBm. Thus, an effect of the jamming intensity of the mobile device 100 on the emission intensity of the mobile device 100 can be ignored. Because the strength of the received signals of the mobile device 100 is superposed by the jamming intensity of the mobile device 100 and the signal strength that the mobile device 100 receives from the base station 300, when the mobile device 100 accepts a low jamming intensity, the path balance value is not greater than the predefined threshold value, for example, the path balance value is about 1 dB or about 2 dB. When the mobile device 100 accepts a high jamming intensity, the path balance value is greater than the predefined threshold value, for example, the path balance value is about 10 dB or about 12 dB, When the path balance value is greater than the predefined threshold value, the adjusting module 14 obtains the transmitting power of the mobile device 100, and increases the transmitting power of the mobile device 100 according to the path balance value to improve call performance of the mobile device 100. In one embodiment, the adjusting module 14 obtains a variable value by subtracting a predetermined value from the path balance value, and increases the variable value to the transmitting power of the mobile device 100. The predetermined value is a value that is less than the predefined threshold value, such as 0 dB or 2 dB. For example, if the path balance value is 10 dB and the predefined threshold value is 4 dB, the adjusting module 14 increases the transmitting power of the mobile device 100. If the transmitting power of the mobile device 100 is 10 dBm and the predetermined value is 2 dB, the adjusting module 14 increases the transmitting power of the mobile device 100 to 18 dB.

In the embodiment, if a power value that is obtained by the variable value increased to the transmitting power of the mobile device 100 is greater than the maximum transmitting power of the mobile device 100, the adjusting module 14 adjusts the transmitting power of the mobile device 100 to be equal to the maximum transmitting power of the mobile device 100.

In the embodiment, if a signal strength of the base station 300 can be adjusted, and if sound quality of the mobile device 100 is not adequate after the transmitting power of the mobile device 100 is increased by the adjusting module 14, the adjusting module 14 sends a control signal to the base station 300 for increasing the signal strength of the base station 300. In one embodiment, if the bit error ratio of the mobile device is greater than a predetermined value, it indicates that the sound quality of the mobile device 100 is not adequate. The predetermined value is preset according to the performance of the mobile device 100, for example, the predetermined value of a GSM mobile device is set as 2.44%.

In the embodiment, the transmitting power of the mobile device 100 is adjusted according to the strength of the received signals of the mobile device 100 and the emission intensity of the mobile device 100. When the mobile device 100 accepts a high jamming intensity, the transmitting power of the mobile device 100 cannot be decreased. Thus, call-dropping of the mobile device 100 is effectively reduced, and call performance of the mobile device 100 is improved.

Figure 2:
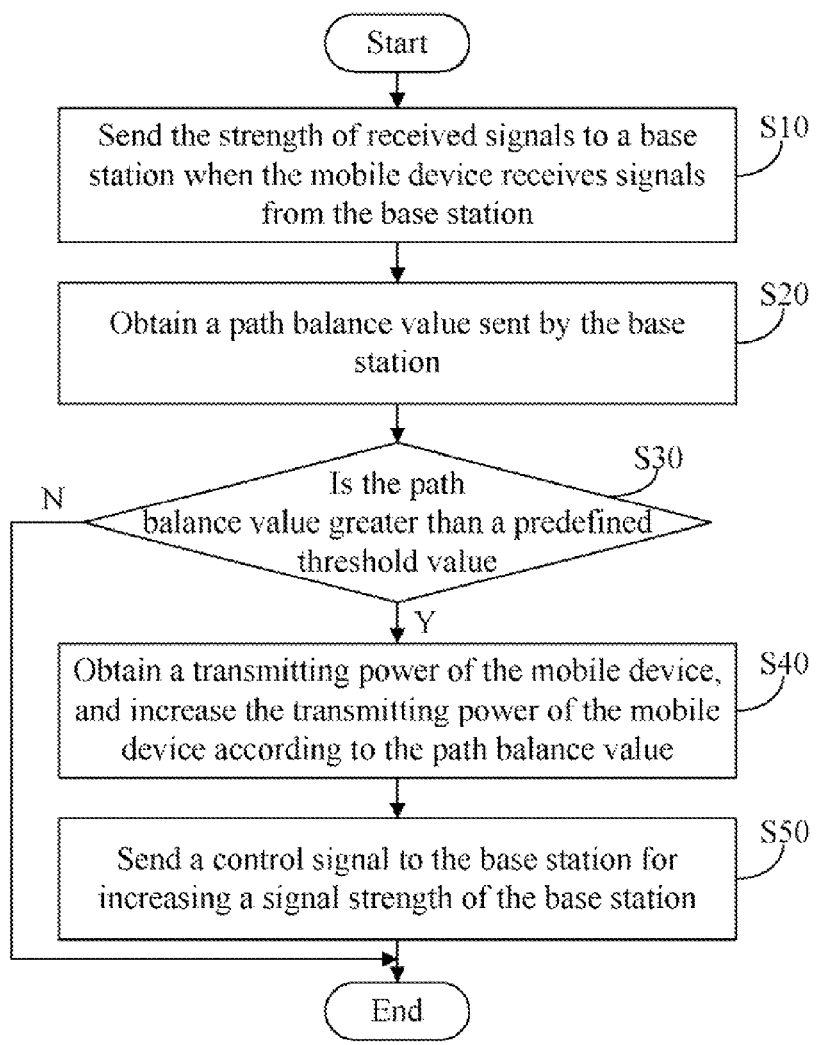
FIG. 2 is a flowchart illustrating one embodiment of a method for improving call performance of the mobile device of FIG. 1.

FIG. 2 is a flowchart illustrating one embodiment of a method for improving call performance of the mobile device 100. Depending on the embodiment, additional steps may be added, others deleted, and the ordering of the steps may be changed.

In step S10, the transmitting module 11 sends the strength of received signals to the base station 300 when the mobile device 100 receives signals from the base station 300. In the embodiment, the strength of the received signals of the mobile device 100 is superposed by a jamming intensity of the mobile device 100 and the signal strength that the mobile device 100 actually receives from the base station 300.

In step S20, the obtaining module 12 obtains a path balance value sent by the base station 300. The path balance value is a difference between the strength of the received signals of the mobile device 100 and an emission intensity of the mobile device 100.

In step S30, the determination module 13 determines whether the path balance value is greater than a predefined threshold value. If the path balance value is greater than the predefined threshold value, step S40 is implemented. If the path balance value is not greater than the predefined threshold value, the procedure ends.

In step S40, the adjusting module 14 obtains the transmitting power of the mobile device 100, and increases the transmitting power of the mobile device 100 according to the path balance value to improve call performance of the mobile device 100. In one embodiment, the adjusting module 14 obtains a variable value by subtracting a predetermined value from the path balance value, and increases the variable value to the transmitting power of the mobile device 100. In the embodiment, if a power value that is obtained by the variable value increased to the transmitting power of the mobile device 100 is greater than the maximum transmitting power of the mobile device 100, the adjusting module 14 adjusts the transmitting power of the mobile device 100 to be equal to the maximum transmitting power of the mobile device 100.

In step S50, if a signal strength of the base station 300 can be adjusted, and if sound quality of the mobile device 100 is not adequate after the transmitting power of the mobile device 100 is increased by the adjusting module 14, the adjusting module 14 sends a control signal to the base station 300 for increasing the signal strength of the base station 300.

All of the processes described above may be embodied in, and be fully automated via, functional code modules executed by one or more general-purpose processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

The described embodiments are merely possible examples of implementations, set forth for a clear understanding of the principles of the present disclosure. Many variations and modifications may be made without departing substantially from the spirit and principles of the present disclosure. All such modifications and variations are intended to be comprised herein within the scope of this disclosure and the described inventive embodiments, and the present disclosure is protected by the following claims.

What is claimed is:

1. A computer-implemented method for improving call performance of a mobile device that communicates with a base station, the method comprising:
   sending the strength of received signals to the base station when the mobile device receives signals from the base station;
   obtaining a path balance value sent by the base station, wherein the path balance value is obtained according to the strength of the received signals of the mobile device and an emission intensity of the mobile device;
   determining whether the path balance value is greater than a predefined threshold value; and
   obtaining a transmitting power of the mobile device, and increasing the transmitting power of the mobile device according to the path balance value to improve call performance of the mobile device when the path balance value is greater than the predefined threshold value, wherein the transmitting power of the mobile device is increased by:
   obtaining a variable value by subtracting a predetermined value from the path balance value, wherein the predetermined value is less than the predefined threshold value; and
   increasing the variable value to the transmitting power of the mobile device.

2. The method as described in claim 1, further comprising:
   sending a control signal to the base station for increasing a signal strength of the base station when the signal strength of the base station is adjusted and sound quality of the mobile device is not adequate.

3. The method as described in claim 1, wherein the strength of the received signals of the mobile device is superposed by a jamming intensity of the mobile device and signal strength that the mobile device actually receives from the base station.

4. The method as described in claim 1, wherein the path balance value is a difference between the strength of the received signals of the mobile device and the emission intensity of the mobile device.

5. The method as described in claim 1, wherein the increasing step comprises:
   adjusting the transmitting power of the mobile device to be equal to a maximum transmitting power of the mobile device when a power value that is obtained by the variable value increased to the transmitting power of the mobile device is greater than the maximum transmitting power of the mobile device.

6. A mobile device for improving call performance of the mobile device that communicates with a base station, the mobile device comprising:
   at least one processor; and
   a non-transitory computer-readable storage medium storing one or more programs, which when executed by the at least one processor, causes the at least one processor to:
   send the strength of received signals to the base station when the mobile device receives signals from the base station;
   obtain a path balance value sent by the base station, wherein the path balance value is obtained according to the strength of the received signals of the mobile device and an emission intensity of the mobile device;
   determine whether the path balance value is greater than a predefined threshold value; and
   obtain a transmitting power of the mobile device, and increase the transmitting power of the mobile device according to the path balance value to improve call performance of the mobile device when the path balance value is greater than the predefined threshold value, wherein the transmitting power of the mobile device is increased by:
   obtaining a variable value by subtracting a predetermined value from the path balance value, wherein the predetermined value is less than the predefined threshold value; and
   increasing the variable value to the transmitting power of the mobile device.

7. The mobile device as described in claim 6, wherein the one or more programs further cause the at least one processor to:
   send a control signal to the base station for increasing a signal strength of the base station when the signal strength of the base station is adjusted and sound quality of the mobile device is not adequate.

8. The mobile device as described in claim 6, wherein the strength of the received signals of the mobile device is superposed by a jamming intensity of the mobile device and signal strength that the mobile device actually receives from the base station.

9. The mobile device as described in claim 6, wherein the path balance value is a difference between the strength of the received signals of the mobile device and the emission intensity of the mobile device.

10. The mobile device as described in claim 6, wherein the one or more programs further cause the at least one processor to:
    adjust the transmitting power of the mobile device to be equal to a maximum transmitting power of the mobile device when a power value that is obtained by the variable value increased to the transmitting power of the mobile device is greater than the maximum transmitting power of the mobile device.

11. A non-transitory computer-readable storage medium having stored thereon instructions that, when executed by a processor of a mobile device, causes the processor to improve call performance of the mobile device that communicates with a base station, the method comprising:
    sending the strength of received signals to the base station when the mobile device receives signals from the base station;
    obtaining a path balance value sent by the base station, wherein the path balance value is obtained according to the strength of the received signals of the mobile device and an emission intensity of the mobile device;
    determining whether the path balance value is greater than a predefined threshold value; and
    obtaining a transmitting power of the mobile device, and increasing the transmitting power of the mobile device according to the path balance value to improve call performance of the mobile device when the path balance value is greater than the predefined threshold value, wherein the transmitting power of the mobile device is increased by:
    obtaining a variable value by subtracting a predetermined value from the path balance value, wherein the predetermined value is less than the predefined threshold value; and
    increasing the variable value to the transmitting power of the mobile device.

12. The non-transitory computer-readable storage medium as described in claim 11, wherein the method further comprises:
    sending a control signal to the base station for increasing a signal strength of the base station when the signal strength of the base station is adjusted and sound quality of the mobile device is not adequate.

13. The non-transitory computer-readable storage medium as described in claim 11, wherein the strength of the received signals of the mobile device is superposed by a jamming intensity of the mobile device and signal strength that the mobile device actually receives from the base station.

14. The non-transitory computer-readable storage medium as described in claim 11, wherein the path balance value is a difference between the strength of the received signals of the mobile device and the emission intensity of the mobile device.

15. The non-transitory computer-readable storage medium as described in claim 11, wherein the increasing step comprises:

adjusting the transmitting power of the mobile device to be equal to a maximum transmitting power of the mobile device when a power value that is obtained by the variable value increased to the transmitting power of the mobile device is greater than the maximum transmitting power of the mobile device.

* * * * *